United States Patent
Lu et al.

(10) Patent No.: US 10,927,009 B2
(45) Date of Patent: Feb. 23, 2021

(54) METHOD FOR DIRECTLY PREPARING EXPANDED GRAPHITE OR GRAPHENE UNDER NORMAL TEMPERATURE AND NORMAL PRESSURE

(71) Applicant: FUDAN UNIVERSITY, Shanghai (CN)

(72) Inventors: Hongbin Lu, Shanghai (CN); Jiajia Zhang, Shanghai (CN); Yufei Chen, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 343 days.

(21) Appl. No.: 15/776,968

(22) PCT Filed: Nov. 17, 2016

(86) PCT No.: PCT/CN2016/106285
§ 371 (c)(1),
(2) Date: May 17, 2018

(87) PCT Pub. No.: WO2017/084606
PCT Pub. Date: May 26, 2017

(65) Prior Publication Data
US 2018/0327268 A1 Nov. 15, 2018

(30) Foreign Application Priority Data

Nov. 18, 2015 (CN) .......................... 201510792745.0

(51) Int. Cl.
*C01B 32/19* (2017.01)
*C01B 32/225* (2017.01)
(Continued)

(52) U.S. Cl.
CPC ............ *C01B 32/19* (2017.08); *C01B 32/192* (2017.08); *C01B 32/225* (2017.08); *C01B 32/23* (2017.08);
(Continued)

(58) Field of Classification Search
CPC ....... C01B 32/19; C01B 32/192; C01B 32/23; C01B 32/225; C01B 2204/30;
(Continued)

(56) References Cited

FOREIGN PATENT DOCUMENTS

| CN | 102173414 | 9/2011 |
| CN | 102431999 | 5/2012 |

(Continued)

OTHER PUBLICATIONS

PCT/CN2016/106285 International Search Report and Written Opinion of the International Searching Authority dated Feb. 17, 2017 (14 pages).

*Primary Examiner* — Daniel C. McCracken
(74) *Attorney, Agent, or Firm* — Michael Best & Friedrich LLP

(57) ABSTRACT

Provided are a method for directly preparing expanded graphite or graphene under normal temperature and normal pressure, a graphene material, and a product. The method comprises the following specific steps: firstly dispersing graphite in an acidic medium containing an oxidizing agent, and then enabling obtained suspension liquid to stand under normal temperature and normal pressure, thus obtaining expanded graphite. The method does not involve any high-temperature high-pressure reaction process, is safe in operation, low in energy consumption and high in efficiency, and is environmentally-friendly. Obtained expanded graphite can realize 50-1500 times of volume expansion, and an sp2 hybridization structure of a graphene sheet layer is basically not damaged; and the obtained expanded graphite can be (Continued)

widely applied to the fields of energy storage, heat management, photoelectronic devices, solar cells, anti-corrosive materials, various composite materials, and the like. The prepared expanded graphite can also be used as a precursor for preparing high-quality graphene, and the high-quality graphene basically containing no defects can be obtained by peeling off the expanded graphite.

9 Claims, 2 Drawing Sheets

(51) Int. Cl.
  *C01B 32/192* (2017.01)
  *C01B 32/23* (2017.01)
  *B82Y 40/00* (2011.01)
  *B82Y 30/00* (2011.01)

(52) U.S. Cl.
  CPC ............ *B82Y 30/00* (2013.01); *B82Y 40/00* (2013.01); *C01B 2204/02* (2013.01); *C01B 2204/30* (2013.01); *C01B 2204/32* (2013.01); *C01P 2002/82* (2013.01); *C01P 2002/84* (2013.01); *C01P 2004/02* (2013.01); *C01P 2004/04* (2013.01)

(58) Field of Classification Search
  CPC ............ C01B 2204/32; C01B 2204/02; C01B 32/182; C01B 32/198; C01B 2204/00; C01B 2204/04; C01B 2204/06; C01B 2204/065; C01B 2204/20; C01B 2204/22; C01B 2204/24; C01B 2204/26; C01B 2204/28; C01B 32/20; C01B 32/205; C01B 32/21; C01B 32/215; C01B 32/22; B82Y 40/00; B82Y 30/00; C01P 2002/82; C01P 2004/02; C01P 2004/04; C01P 2002/84
  See application file for complete search history.

(56) References Cited

FOREIGN PATENT DOCUMENTS

| | | |
|---|---|---|
| CN | 102452649 | 5/2012 |
| CN | 103253661 | 8/2013 |
| CN | 103833008 | 6/2014 |
| CN | 105253878 | 1/2016 |

METHOD FOR DIRECTLY PREPARING EXPANDED GRAPHITE OR GRAPHENE UNDER NORMAL TEMPERATURE AND NORMAL PRESSURE

CROSS-REFERENCE TO RELATED APPLICATION(S)

This application is a U.S. national stage filing under 35 U.S.C. § 371 of International Patent Application No. PCT/CN2016/106285, filed on Nov. 17, 2016, which application claims the benefit of Chinese Patent Application No. 201510792745.0, filed on Nov. 18, 2015, the entire contents of each of which are fully incorporated herein by reference.

TECHNICAL FIELD

The invention belongs to the field of material preparation, in particular relates to a method for directly preparing expanded graphite under normal temperature and normal pressure, and uses expanded graphite as a precursor to prepare high-quality graphene. The invention can be used for large-scale industrial production of high-quality, low-cost expanded graphite, graphene and composite materials thereof.

BACKGROUND ART

Since graphene was successfully prepared in 2004, it has become a star material in the field of scientific research and industry. Graphene has a high specific surface area and excellent optical, mechanical, electrical properties, and has been widely used in energy, environment, composite material, coating and other fields. In order to realize large-scale application of graphene, it is very important to establish a simple and efficient method for preparing graphene.

In the preparation method of graphene, the top-down exfoliation is considered as a key way to realize large-scale application of graphene. The exfoliation is usually carried out by using natural or synthetic graphite as a raw material, which is prepared into a graphene material by means such as redox, ultrasonic, shearing, ball milling and the like. Because graphite is a closely packed structure formed from the $sp^2$ hybrid monoatomic carbon layer by π-π mode, the interlayer interaction forces are strong. In order to overcome such interaction, a strong external force input is often required, which makes the preparation efficiency of graphene lower. Therefore, weakening the interlayer interaction forces of graphene is a key step in improving the preparation efficiency of graphene materials. Interlayer expansion can significantly reduce the interaction force between graphene sheets, which can effectively improve the yield and efficiency during exfoliating preparation of graphene.

In the disclosed method for producing expanded graphite, an intercalated graphite is firstly prepared after the graphite is mainly treated with an oxidant/acid mixture, then the intercalated graphite is washed with water and dried, and then expanded under a high temperature condition. The preparation process of such expanded graphite requires a high temperature reaction process, and the energy consumption is relatively high. The structure of the resulting expanded graphite is not uniform, and graphene sheets are still accumulated in dozens or even hundreds of sheets in the expanded aggregates. It is time consuming and difficult to re-disperse them in a liquid for further exfoliation, full exfoliation is difficult and the yield is limited. In addition, since the obtained expanded graphite is in a dry state, the thickness of the sheet is also relatively large, which is not conducive to composite with other materials and optimize the performance.

SUMMARY OF THE INVENTION

In order to overcome the existing difficulties in the preparation of expanded graphite and graphene, the purpose of the present invention is to establish a simple, high-efficient method for preparing expanded graphite under normal temperature and normal pressure, and basing on this to establish a method for preparing low cost and high quality graphene. Compared with the existing method for preparing expanded graphite, the method is completed under normal temperature and normal pressure in one step without any high-temperature and high-pressure processing steps, and the expanded graphite thus obtained does not additionally introduce defects or other impurities. Defectless and high quality graphene powder and slurry can be further prepared by using the obtained expanded graphite as a raw material.

The present invention provides a method for directly preparing expanded graphite or graphene under normal temperature and normal pressure. A graphite as a raw material is firstly dispersed in an acidic solution to obtain a suspension, and then the obtained suspension is allowed to stand for a certain period of time under normal temperature and normal pressure to obtain an expanded graphite which is then washed with water and exfoliated to obtain a graphene dispersion liquid. After the solvent is removed by solid-liquid separation from the graphene dispersion liquid, it can be dispersed in an organic solvent to form a slurry. The specific steps are as follows:

(1) one part by weight of the raw material graphite is added to 1 to 200 parts by weight of the acidic solution to obtain a suspension. The resulting suspension is stirred under normal temperature and normal pressure for 1 minute to 2 hours, and then allowed to stand for 1 to 48 hours to obtain an expanded graphite; the acidic solution is a sulfuric acid solution containing an oxidizing agent, the oxidizing agent is anyone of ammonium persulfate, potassium persulfate, sodium persulfate and hydrogen peroxide, and the amount of the oxidizing agent is 0.1-20 times the weight of the graphite;

(2) the obtained expanded graphite is washed with deionized water and filtered to obtain a wet expanded graphite; the wet expanded graphite is exfoliated in a solution to obtain a graphene dispersion liquid;

(3) the graphene dispersion liquid after being exfoliated is spray-dried to obtain a graphene powder, or centrifugated/filtrated to obtain a graphene slurry or a wet graphene solid, and the wet graphene solid is easily re-dispersed in other solvents.

In the present invention, the graphite as a raw material described in step (1) refers to anyone of flake graphite, artificial graphite and pyrolytic graphite, and the carbon content is greater than 95%.

In the present invention, the solution described in step (2) is one or more of a pure aqueous solution, N-methylpyrrolidone, N,N-dimethylformamide, N,N-dimethylacetamide, toluene, ethylbenzene, chlorobenzene, dichlorobenzene, methanol, ethanol, propanol, isopropanol, butanol, pentanol, benzyl benzoate, ethyl acetate, butyl acetate and chloroform.

In the present invention, the exfoliating method in step (2) is water bath ultrasonic, probe ultrasonic, high speed shear, fluid comminution or any combination thereof, wherein, the ultrasonic power of the water bath ultrasonic is 20-5000 W, the ultrasonic power of the probe ultrasonic is 50-5000 W;

the system temperature is controlled at 80° C. or less during ultrasonic; the ultrasonic time is 10 minutes-10 hours; the shear power in high speed shear is 100 W-10 kW, the shear rate is 1000-100,000 revolutions, the operating temperature is controlled at 80° C. or less, the shear time is from 10 minutes to 10 hours; the fluid pressure is controlled at 200 MPa or less during fluid comminution and exfoliation, the flow is controlled at 1.0-500 L/h, and the operating temperature is 80° C. or less.

In the present invention, the spray drying described in step (3) employs a conventional aqueous or organic phase spray drying apparatus. The rotational speed of the separating centrifuge is 1,000 to 20,000 rpm.

Compared with the prior art, the present invention has the following outstanding advantages:

(1) it does not need high temperature and high pressure operation, the expansion process is carried out under normal temperature and normal pressure without any external work input, and is a spontaneous expansion process under ambient conditions.

(2) compared to raw flake graphite, the expanded graphite worm has a maximum expanding volume of more than 1000 times and is in a wet state, which facilitates re-dispersion, exfoliating, and integrating with downstream applications.

(3) after the expanded graphite as a precursor is subjected to an exfoliation operation, the $sp^2$ lattice structure of the graphene obtained is well preserved without introducing defects.

(4) the graphene slurry or the wet graphene solid obtained in the present invention has a high dispersibility.

(5) the method is simple in operation, mild in terms of conditions, environmentally friendly, low in production cost, and convenient for industrial large-scale production.

DETAILED DESCRIPTION OF THE INVENTION

Figure 1:
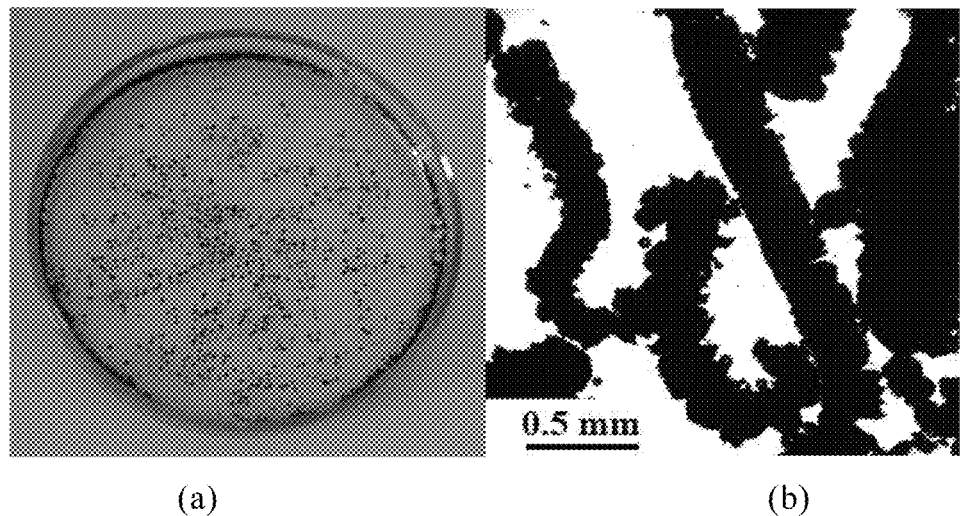
FIG. 1 is a contrast graph showing the volume change of graphite before and after expansion, wherein: (a) is raw material graphite, (b) is expanded graphite.

The present invention will be further described below with reference to the drawings and specific embodiments. The following examples are intended to understand the present invention and do not limit the content of the invention. It should be understood that the one or more steps mentioned in the present invention do not exclude other methods and steps before or after the combination step, or other methods and steps may also be interposed between these explicitly mentioned steps. It should also be understood that these examples are only for illustrating the present invention and are not intended to limit the scope of the present invention. Unless otherwise indicated, the numbering of each method step is only for the purpose of identifying each method step, and is not intended to limit the arrangement order of each method or to limit the scope of implementation of the present invention, and the change or adjustment of the relative relationship of the number without substantial technical content can be also considered to be an implementable scope of the present invention.

Terms

As used herein, "normal temperature and normal pressure" refers to a temperature (5-50° C.) and pressure (atmospheric pressure or about 101.325 kPa) under ambient conditions.

Expanded Graphite

The method for preparing expanded graphite of the present invention does not require high temperature and high pressure operation, and is a one-time effective and spontaneous expansion process under normal temperature and normal pressure conditions.

The expansion according to the present invention is a liquid-state expansion rather than a solid-state expansion, and the operation is simple and the cost is lower.

The expansion according to the present invention is carried out at a temperature of 5-40° C. and under ambient pressure (one atmospheric pressure) using one or more acidic solutions selected from the group consisting of ammonium persulfate, potassium persulfate, sodium persulfate and hydrogen peroxide solution in sulfuric acid.

Graphene Oxide and Graphene

As used herein, the prepared graphene slurry or wet graphene may be a defect-containing oxided graphene (graphene oxide) or a defect-free non-oxidated graphene. The skilled in the art can prepare graphene after treating graphene oxide with a reducing agent treatment or after high temperature reduction as needed.

The defect ratio (Raman D band and G band intensity ratio) of the graphene material according to the present invention is less than or equal to 0.1.

Graphene Slurry or Wet Graphene Solid

The graphene slurry or wet graphene solid obtained by the preparation method of the present invention is easy to be re-dispersed again in other solvents and has good dispersibility. The other solvent is selected from the group consisting of N-methylpyrrolidone, N,N-dimethyl formamide, N,N-dimethyl sulfoxide, benzyl benzoate, alcohol, water, and a combination thereof.

Example 1

(1) 10 g of ammonium persulfate was added to 300 ml of concentrated sulfuric acid, followed by addition of 1 g of raw material graphite. The mixture was stirred for 15 minutes, and then left to stand at room temperature for 6 hours, and then filtered to obtain an acid-containing expanded graphite.

(2) The acid-containing expanded graphite in step (1) was added to deionized water, which was filtered and then washed again with water to obtain water-washed expanded graphite. FIG. 1 showed the appearance of raw material graphite and expanded graphite.

(3) The water-washed expanded graphite obtained in step (2) was added to water under wet conditions and underwent an ultrasonic treatment with a 500 W and 20 kHz probe at 25° C. for 60 minutes to obtain a graphene dispersion liquid.

(4) The graphene dispersion liquid obtained in step (3) was filtered and dispersed in a solvent.

The graphene dispersion liquid in N-methylpyrrolidone, N,N-dimethylformamide, N,N-dimethyl sulfoxide, benzyl benzoate, isopropyl alcohol or other solvent obtained by the above method was left to stand. One month later, no significant precipitation occurred, indicating that the graphene obtained by this present method has stable performance.

Figure 3:
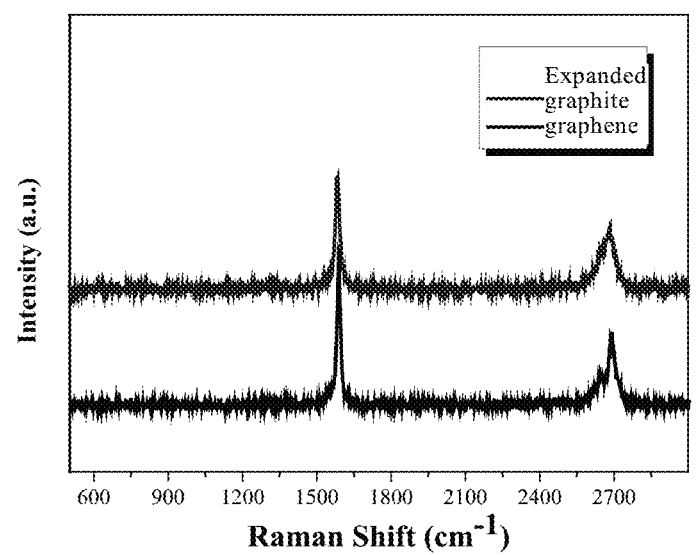
FIG. 3 shows the Raman spectrum of graphene.

As shown in FIG. 3, there is almost no D-band peak in the Raman spectrum, indicating that the resulting graphene is a low defect or substantially defect-free graphene.

Figure 2:
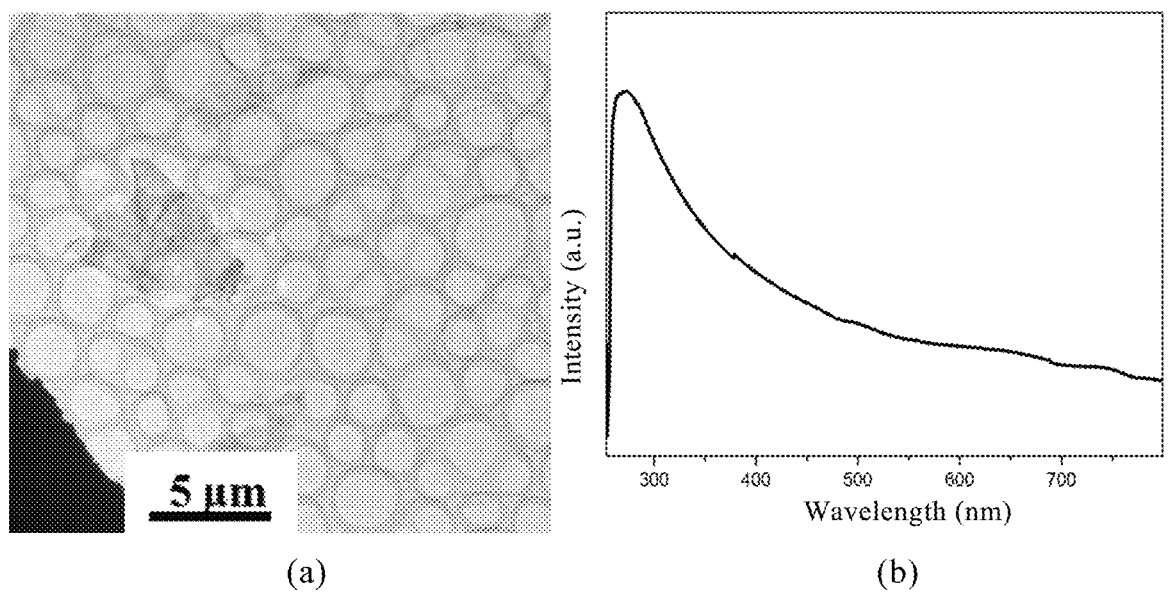
FIG. 2 shows TEM micrograph of the exfoliated graphene and the ultraviolet absorption spectrum of the graphene suspension, wherein (a) is a TEM image of graphene, and (b) is an ultraviolet absorption spectrum of the graphene dispersion liquid.

FIG. 2 shows the TEM image of the exfoliated graphene and characteristic absorption in the graphene suspension UV spectra, indicating that the exfoliated graphene sheet has a monolayer and less-layer morphology, monolayer graphene occupies 75% or more, and the layer size is around 5-10 microns and the UV absorption at 270 nm reflects the good lattice integrity of the graphene sheet.

Example 2

(1) The step (1) and step (2) in example 1 were repeated, and the resulting water-washed expanded graphite was added to water, and subjected to shear exfoliating at 18,000 revolutions for 30 minutes using a 500 W shearing disperser to obtain a graphene dispersion liquid.

(2) The graphene dispersion liquid in step (1) was subjected to suction filtration and dispersed in N-methylpyrrolidone, N,N-dimethylformamide, N,N-dimethyl sulfoxide, benzyl benzoate, isopropyl alcohol and other solvents. The graphene dispersion liquid obtained by the above method did not produce a significant precipitate after standing for one month.

Example 3

(1) The step (1) and step (2) in example 1 were repeated, and the resulting water-washed expanded graphite was added to water. The mixture was treated at 25° C. using a 750 W high-pressure fluid pulverizer at a flow rate of 1.0 L/h to obtain a graphene dispersion liquid.

(2) The graphene dispersion liquid in step (1) was filtered and dispersed in N-methylpyrrolidone, N,N-dimethylformamide, N,N-dimethyl sulfoxide, benzyl benzoate, alcohol, water or a mixed solvent thereof. After the graphene liquid obtained by the above method was left to stand for one month, no significant precipitation occurred.

Example 4

(1) 100 ml of concentrated sulfuric acid was slowly added to 60 ml of hydrogen peroxide. After the solution was cooled to room temperature, 1 g of raw material graphite was added. The mixture was stirred for 5 minutes, and then allowed to stand at room temperature for 4 hours to obtain an acid-containing expanded graphite.

(2) The acid-containing expanded graphite in step (1) was added to deionized water, filtered and then washed with water to obtain a water-washed expanded graphite.

(3) The water-washed expanded graphite in step (2) was suction-filtered, and then added to water under wet conditions, which underwent an ultrasonic treatment at 25° C. with a 500 W and 20 kHz probe for 40 minutes to obtain a graphene dispersion liquid.

(4) The graphene dispersion liquid in step (3) was suction-filtered and dispersed in N-methylpyrrolidone, N,N-dimethylsulfoxide, benzyl benzoate, alcohol, water or a mixed solvent thereof.

After the graphene dispersion liquid in N-methyl pyrrolidone, N,N-dimethylformamide, N,N-dimethyl sulfoxide, benzyl benzoate, alcohol, water or a mixed solvent thereof obtained by the above method was allowed to stand for one month, no significant precipitation occurred.

Example 5

(1) The steps (1) and (2) of example 4 were repeated, and the resulting water-washed expanded graphite was added to water, and subjected to shear exfoliating at 18,000 revolutions for 30 minutes using a 500 W shear disperser to obtain a graphene dispersion liquid.

(2) The graphene dispersion liquid in step (1) was suction-filtered and dispersed in N-methylpyrrolidone, N,N-dimethylformamide, N,N-dimethyl sulfoxide, benzyl benzoate, isopropyl alcohol and other solvent. The graphene dispersion liquid in N-methylpyrrolidone, N,N-dimethylformamide, N,N-dimethyl sulfoxide, benzyl benzoate, alcohol, water, or a mixed solvent thereof obtained by the above method was allowed to stand for one month, no significant precipitation occurred.

Example 6

(1) Repeat steps (1) and (2) of example 4, the obtained water-washed expanded graphite was added to water, and the mixture was treated at 25° C. by using a 750 W high-pressure fluid pulverizer at a flow rate of 1.0 L/h to obtain a graphene dispersion liquid.

(2) The graphene dispersion liquid in step (1) was suction-filtered and dispersed in N-methylpyrrolidone, N,N-dimethylformamide, N,N-dimethyl sulfoxide, benzyl benzoate, alcohol, water or a mixed solvent thereof. The graphene dispersion liquid in N-methylpyrrolidone, N,N-dimethylformamide, N,N-dimethyl sulfoxide, benzyl benzoate, isopropyl alcohol or other solvent obtained by the above method was allowed to stand. One month later, no significant precipitation occurred.

Example 7

(1) 10 g of potassium sulphate was added to 100 ml of concentrated sulfuric acid, and 1 g of raw material graphite was further added. The mixture was stirred for 20 minutes, and allowed to stand at room temperature for 4 hours to obtain an acid-containing expanded graphite.

(2) The acid-containing expanded graphite in step (1) was added to deionized water, washed with water after suction filtration, and the water-washed expanded graphite was obtained.

(3) The water-washed expanded graphite in step (2) was added to water under wet conditions, and treated ultrasonically with a 500 W and 20 kHz probe at 25° C. for 50 minutes to obtain a graphene dispersion liquid.

(4) The solvent was removed by centrifugation from the graphene dispersion liquid in step (3) which was then dispersed in N-methylpyrrolidone, N,N-dimethylformamide, N,N-dimethyl sulfoxide, benzyl benzoate, alcohol, water, or a mixed solvent thereof.

After the graphene dispersion liquid in N-methylpyrrolidone, N,N-dimethylformamide, N,N-dimethyl sulfoxide, benzyl benzoate, alcohol, water, or a mixed solvent thereof obtained by the above method was allowed to stand for one month, no significant precipitation occurred, indicating that the graphene obtained by the present method had stable performance. There was almost no D-band peak on the Raman spectrum, indicating that the resulting graphene was a low-defect graphene.

Example 8

(1) 10 g of sodium persulfate was added to 100 ml of concentrated sulfuric acid, and 1 g of raw material graphite was added. After being stirred for 10 minutes, the mixture was allowed to stand at room temperature for 4.5 hours to obtain an acid-containing expanded graphite.

(2) The acid-containing expanded graphite in step (1) was added to deionized water, washed with water after suction filtration, and the water-washed expanded graphite was obtained.

(3) The water-washed expanded graphite in step (2) was suction-filtered, and then added to water under wet conditions, and the mixture was treated ultrasonically with a 500 W and 20 kHz probe at 25° C. for 40 minutes to obtain a graphene dispersion liquid.

(4) The graphene dispersion liquid in step (3) was suction-filtered and dispersed in N-methylpyrrolidone, N,N-dimethylformamide, N,N-dimethyl sulfoxide, benzyl benzoate, alcohol, water or a mixed solvent thereof.

After the graphene dispersion liquid in N-methylpyrrolidone, N,N-dimethylformamide, N,N-dimethyl sulfoxide, benzyl benzoate, alcohol, water or a mixed solvent thereof prepared by the above method was allowed to stand for one month, no significant precipitation occurred, indicating that the graphene obtained by the present method had stable performance. There was almost no D-band peak on the Raman spectrum, indicating that the resulting graphene was a low-defect graphene.

Comparative Example 1

(1) 1 g of raw material graphite was added to 100 ml of hydrogen peroxide, and the mixture was stirred at room temperature for 20 minutes, and then allowed to stand for 48 hours.

(2) The mixed solution in step (1) was added to deionized water, and the mixture was washed repeatedly after suction filtration to obtain a water-washed product.

(3) The water-washed product in step (2) was added to water under wet conditions and treated ultrasonically with a 500 W, 20 kHz probe at 25° C. for 2 hours to obtain a dispersion liquid.

(4) The dispersion liquid in step (3) was suction-filtered and dispersed in N-methylpyrrolidone, N,N-dimethylformamide, N,N-dimethyl sulfoxide, benzyl benzoate, alcohol, water or a mixed solvent thereof.

No expansion of graphite was seen in the above method, and no significant amount of exfoliated graphene was obtained after ultrasonic treatment.

It shows that the hydrogen peroxide treatment only can't achieve a good exfoliation through probe ultrasonic, indicating that the expansion process is the key to achieve good exfoliation by ultrasonic treatment.

Comparative Example 2

The steps of (1) and (2) in comparative example 1 were repeated, and the wet water-washed expanded graphite was added to water, and the mixture was treated by using a 750 W high-pressure fluid pulverizer at a flow rate of 1.0 L/h at 25° C. The dispersion liquid was suction-filtered and then dispersed in N-methylpyrrolidone, N,N-dimethylformamide, N,N-dimethyl sulfoxide, benzyl benzoate, alcohol, water or a mixed solvent thereof. No expansion of the graphite was observed, and no exfoliated graphene was obtained after the high-pressure fluid pulverization treatment.

It shows that the hydrogen peroxide treatment only cannot achieve a good exfoliation by the high-pressure fluid pulverizer, which reflects the importance of the expansion process to realize the graphene exfoliation in high-yield by using the high-pressure fluid pulverizer.

Comparative Example 3

(1) 1 g of raw material graphite was added to 100 ml of concentrated sulfuric acid, and the mixture was stirred at room temperature for 20 minutes, and then allowed to stand for 48 hours.

(2) The acidic mixture in step (1) was added to deionized water, and the mixture was washed repeatedly after suction filtration to obtain a water-washed product.

(3) The water-washed product in step (2) was added to water under wet conditions and treated ultrasonically with a 500 W, 20 kHz probe at 25° C. for 2 hours to obtain a dispersion liquid.

(4) The dispersion liquid in step (3) was suction-filtrated and dispersed in N-methylpyrrolidone, N,N-dimethylformamide, N,N-dimethyl sulfoxide, benzyl benzoate, alcohol, water or a mixed solvent thereof.

No expansion of graphite was observed in the above method, and no exfoliated graphene was obtained after ultrasonic treatment.

It explains the key role of hydrogen peroxide in achieving graphite expansion. The sulfuric acid treatment only can not achieve good expansion or high-yield preparation of graphene by ultrasonic treatment.

Comparative Example 4

The steps (1) and (2) of comparative example 3 were repeated, and the wet water-washed expanded graphite was added to water, and the above mixed liquid was treated using a 750 W high-pressure fluid pulverizer at a flow rate of 1.0 L/h at 25° C. The dispersion liquid was suction-filtered and dispersed in N-methylpyrrolidone, N,N-dimethylformamide, N,N-dimethyl sulfoxide, benzyl benzoate, alcohol, water or a mixed solvent thereof. No expansion of graphite was observed, and no significant amount of exfoliated graphene was obtained after high-pressure fluid pulverization treatment.

It shows the key role of hydrogen peroxide in achieving graphite expansion. The sulfuric acid treatment only can not achieve good expansion or high-yield exfoliating preparation of graphene by using high-pressure fluid pulverizer.

The invention claimed is:

1. A method for directly preparing expanded graphite or graphene under normal temperature and normal pressure, wherein, a graphite as a raw material is firstly dispersed in an acidic solution to obtain a suspension, and then the obtained suspension is allowed to stand for a certain period of time under normal temperature and normal pressure to obtain an expanded graphite; the expanded graphite is washed with water and then exfoliated to obtain a graphene dispersion liquid; after the solvent was removed by solid-liquid separation from the graphene dispersion liquid, it can be dispersed in an organic solvent to form a slurry; and the method including steps of:

(1) one part by weight of the raw material graphite is added to 1 to 200 parts by weight of the acidic solution to obtain a suspension, the resulting suspension is stirred under normal temperature and normal pressure for 1 minute to 2 hours, and then allowed to stand for 1 to 48 hours to obtain the expanded graphite; the acidic solution is a sulfuric acid solution containing an oxidizing agent, the oxidizing agent is anyone of ammonium persulfate, potassium persulfate, sodium persulfate and hydrogen peroxide, and the amount of the oxidizing agent is 0.1-20 times the weight of the raw material graphite;

(2) the obtained expanded graphite is washed with deionized water and filtered to obtain a wet expanded graphite; the wet expanded graphite is exfoliated in a solution to obtain the graphene dispersion liquid;

(3) the graphene dispersion liquid after being exfoliated is spray-dried to obtain a graphene powder, or centrifugated/filtrated to obtain a graphene slurry or a wet graphene solid, and the wet graphene solid is easily re-dispersed in other solvents.

2. The method of claim 1, wherein the raw material graphite in step (1) refers to anyone of flake graphite, artificial graphite and pyrolytic graphite, and the carbon content is greater than 95%.

3. The method of claim 1, wherein the solution in step (2) is one or more of a pure aqueous solution, N-methylpyrrolidone, N,N-dimethylformamide, N,N-dimethylacetamide, toluene, ethylbenzene, chlorobenzene, dichlorobenzene, methanol, ethanol, propanol, isopropanol, butanol, pentanol, benzyl benzoate, ethyl acetate, butyl acetate and chloroform.

4. The method of claim 1, wherein the exfoliating method in step (2) is water bath ultrasonic, probe ultrasonic, high speed shear, fluid comminution or any combination thereof, wherein, the ultrasonic power of the water bath ultrasonic is 20-5000 W, the ultrasonic power of the probe ultrasonic is 50-5000 W; the system temperature is controlled at 80° C. or less during ultrasonic; the ultrasonic time is 10 minutes-10 hours; the shear power in high speed shear is 100 W-10 kW, the shear rate is 1000-100,000 revolutions, the operating temperature is controlled at 80° C. or less, the shear time is from 10 minutes to 10 hours; the fluid pressure is controlled at 200 MPa or less during fluid comminution and exfoliation, the flow is controlled at 1.0-500 L/h, and the operating temperature is at 80° C. or less.

5. The method of claim 1, wherein the spray drying in step (3) employs a conventional aqueous or organic phase spray drying apparatus, and the rotational speed of the separating centrifuge is 1,000 to 20,000 rpm.

6. The method of claim 1, wherein the graphene oxide or graphene has a radial dimension in the range of 1-10 μm.

7. The method of claim 1, wherein the ratio of monolayer graphene in the graphene oxide or graphene is greater than 75%.

8. The method of claim 1, wherein in the step (1), the amount of the oxidizing agent is 1-19 times the weight of the raw material graphite, preferably 1.5-15 times, more preferably 2-10 times.

9. A method for preparing graphene, comprising the steps of:
(a) reacting a graphite with an acidic solution under normal temperature and normal pressure to obtain an expanded graphite, the acidic solution is a sulfuric acid solution containing an oxidizing agent, and the oxidizing agent is selected form the group consisting of ammonium persulfate, potassium persulfate, sodium persulfate, hydrogen peroxide and a combination thereof;
(b) after mixing the obtained expanded graphite with a solution, the mixture is subjected exfoliation to obtain a graphene dispersion liquid;
(c) drying the graphene dispersion liquid obtained in step (b) to obtain a graphene slurry or a wet graphene solid; and
(d) optionally, dispersing the graphene slurry or wet graphene solid obtained in step (c) to other solvent, and said other solvent is selected from the group consisting of N-methylpyrrolidone, N,N-dimethyl formamide, N,N-dimethyl sulfoxide, benzyl benzoate, alcohols, water, and a combination thereof.

* * * * *